(12) United States Patent
Cho et al.

(10) Patent No.: US 7,315,503 B2
(45) Date of Patent: Jan. 1, 2008

(54) OPTICAL PICK-UP DEVICE USING MICROMIRROR ARRAY LENS

(75) Inventors: Gyoung Il Cho, Seoul (KR); Tae Hyeon Kim, Taejeon (KR); Cheong Soo Seo, Seoul (KR)

(73) Assignees: Angstrom, Inc., Suwon (KR); Stereo Display, Inc., Anaheim, CA (US)

(*) Notice: Subject to any disclaimer, the term of this patent is extended or adjusted under 35 U.S.C. 154(b) by 109 days.

(21) Appl. No.: 10/934,133

(22) Filed: Sep. 3, 2004

(65) Prior Publication Data

US 2006/0171263 A1 Aug. 3, 2006

(51) Int. Cl.
*G11B 7/135* (2006.01)

(52) U.S. Cl. ............................ 369/112.29; 369/44.32; 369/112.26

(58) Field of Classification Search .............. 369/44.23, 369/112.29
See application file for complete search history.

(56) References Cited

U.S. PATENT DOCUMENTS

| | | | | |
|---|---|---|---|---|
| 5,881,034 | A * | 3/1999 | Mano et al. ............... | 369/44.14 |
| 6,084,843 | A * | 7/2000 | Abe et al. ................. | 369/112.07 |
| 6,754,154 | B1 | 6/2004 | Takeda et al. | |
| 6,781,930 | B2 | 8/2004 | Fukumoto | |
| 6,934,072 | B1 * | 8/2005 | Kim et al. ................ | 359/291 |
| 6,934,073 | B1 * | 8/2005 | Kim et al. ................ | 359/291 |
| 6,970,284 | B1 * | 11/2005 | Kim et al. ................ | 359/291 |
| 6,995,909 | B1 * | 2/2006 | Hayashi et al. ........... | 359/569 |
| 2002/0018407 | A1 * | 2/2002 | Komoto ................... | 369/44.23 |

FOREIGN PATENT DOCUMENTS

JP 2002288873 A * 10/2002
WO WO 01/26104 A1 * 4/2001

OTHER PUBLICATIONS

English Machine-Assisted Translation of JP 2002-288873 A, translated by The Thomson Corporation.*
A. Feinerman et al, "Agile Micro-Mirrors with Three Degrees of Freedom Manufactured with Liquid MEMS Technology" Free Space Laser Communication and Laser Imaging Proc. SPIE, V. 4489, 2002, pp. 166-176.*
James G. Boyd IV and Gyoungil Cho, "Fast-response Variable Focusing Micromirror Array Lens," Proc. SPIE, vol. 5055, pp. 278-286 (2003).

* cited by examiner

*Primary Examiner*—William R. Korzuch
*Assistant Examiner*—Nathan Danielsen

(57) ABSTRACT

An optical pick-up device comprising at least one micromirror array lens. The micromirror array lens enables focusing, tracking, and/or tilt compensation in the optical pick-up device without macroscopic motions. The micromirror array lens provides the device with a simple structure, which can reduce the size, weight, and cost of the recording/reproducing system. The device is also durable for vibration. Optical pick-up devices using an array of micromirror array lenses can increase the recording/reading speed without macroscopic motions. The recording/reading speed can be increased by adding more micromirror array lenses to the lens array. The present invention can also be used to record/read information on/from a multi-layered optical disc.

18 Claims, 5 Drawing Sheets

OPTICAL PICK-UP DEVICE USING MICROMIRROR ARRAY LENS

FIELD OF THE INVETION

The present invention relates to an optical pick-up device comprising at least one micromirror array lens or an array of micromirror array lenses.

BACKGROUND

An optical pick-up device is generally driven electromagnetically to place the device's objective lens at a desired location along an optical disc, in focusing and tracking directions. For focusing, an optical pick-up actuator serves to move the objective lens to maintain its desired relative position to the disc. For tracking, an optical pick-up device traces tracks of the disk in order to record information on the disk or read information recorded on the disc. In an optical recording/reproducing system for recording and reproducing information, an objective lens is actuated to allow an optical spot to follow the surface vibrations and eccentricity of a disk in order to achieve the desired focusing and tracking operations.

For most optical pick-up devices, a widely used two-axis actuator includes a moving part which conducts macroscopic translational motions for focusing and tracking. The moving part should be actuated without generating unnecessary vibrations in order to reduce optical signal errors. The tilt of the optical disk caused by the deflection and mechanical run-out of the optical disc, increases coma aberration, which is critical in systems with a large numerical aperture. Thus, tilt compensation is strongly required for recording and reproduction systems. However, it is difficult for a two-axis optical pick-up actuator to compensate for coma aberration. Moreover, there is a sub-resonance problem due to mass unbalance or nonlinearlty of the moving parts.

In order to solve those problems, optical pick-up devices used in recording/reproducing systems require three-axis macroscopic mechanical motions for focusing, tracking and tilt compensation. Such a device is described in U.S. Patent No. 2004/0052180 A1. However, three-axis actuators have many other disadvantages, including, but not limited to, their complicated structure, large volume, heavy weight, low speed, high cost, and weakness for vibration.

Recently, the needs for high-density, high-speed, and miniaturization have been increased, and there has been much work to develop technologies to satisfy these needs. A high-density optical disc has been developed to have high capacity. The size of the laser beam focused onto the disc should be reduced to record information on such a high-density disk or to read the recorded information. In order to record and/or read the information on/from the high-density disk, a laser with a reduced wavelength and an objective lens with a large numerical aperture have been used. In addition, other technologies such as multi-layered recording, near-field optical recording, hologram, and so on have been developed to increase the capacity on a data storage media.

Further, technologies, hologram and multi-beam optical pick-up, have been developed for high-speed reproduction. But, these technologies are not practical yet. In addition to the need for high capacity, there is a growing need for small and thin size. However, it is very difficult to satisfy the requirements for high-speed and/or miniaturization with conventional servo technology.

Thus, there is a practical need for an optical pick-up device that provides focusing, tracking, and tilt compensation with minimal macroscopic motion. This device must be able to withstand vibration and satisfy the needs for high-speed, miniaturization, and low production cost.

SUMMARY OF THE INVENTION

The present invention is directed to an optical pick-up device for recording and/or reading information on or from an optical disc. In a preferred embodiment of the present invention, the optical pick-tip device includes a laser diode, a first optical lens, a beam splitter, a second optical lens, a micromirror array lens, an image sensor, a tilt detector, and a signal processor. The laser diode generates a lightbeam which is passed through the first optical lens. The first optical lens collimates the light beam, which is then passed to the beam splitter. The light is passed from the beam splitter to the micromirror array lens. The micromirror array lens deflects the light beam substantially 90°, and focuses the light on the optical disc. Light reflected from the optical disc is collimated by the micromirror array lens, and deflected back towards the beam splitter. The beam splitter then deflects the reflected light substantially 90°, towards the second optical lens. The second optical lens passes the reflected light and focuses it on the optical sensor. The sensor detects the intensity of the reflected light from the reflective layer of the optical disc, and generates an electrical signal based on the intensity of light it receives. The electrical signal is passed to the signal processor. The tilt detector measures the tilt of the optical disc. The measured tilt is sent to the signal processor. The signal processor generates a reproduction signal. The signal processor also generates control data which is sent to the micromirror array lens to adjust the micromirrors to compensate for tracking error, focusing error, and tilt error.

Similarly optical pick-up devices of the present invention are capable of writing data onto the optical disc. In that regard, the intensity of the laser beam emitted by the laser diode is varied according to a data signal transmitted to the laser diode via a data storage device (not shown) within the optical recording/reproducing system. The laser beam is passed through the first optical lens. The first optical lens collimates the light beam. The light beam is then passed to the beam splitter. The light is passed from the beam splitter to the micromirror array lens. The micromirror array lens deflects the light beam substantially 90°, and focuses the light on the dye layer of the optical disc. Depending on the intensity of the laser beam, the dye used to form the optical disc reacts to the heat and light to create a series of recorded pits and lands corresponding the stored data.

When an optical disc is titled in an optical disc drive, the signal quality of a recording signal and/or reproduced signal of the optical disc may be lowered. In order to correct the tilt of the optical disc, the optical pick-up device may comprise a tilt detector. The tile detector detects the tilt of the optical disc and generates a tilt signal in response to the detected tilt. The tilt signal is transmitted to the signal processor. The signal processor processes the tilt signal and transmits a control signal to the micromirror array lens to compensate for tilt error.

Optical devices of the present invention are capable of recording data on and reading data from a multi-layered optical disc. In this instance, the micromirror array lens records and/or reads information at each layer of a multi-layered optical disk by changing its focal length to focus on the desired disc layer.

In other embodiments, the optical pick-up device may comprise a planar array of micromirror array lenses with different shapes, sizes, and numbers of micromirrors. In addition to all the optical parameters such as the focal length, optical axis, lens size, the number of micromirrors, and others of each micromirror array lens, the total number of lenses comprising the array is variable according to the purpose of the array. Each micromirror array lens may have a different optical axis, different number of micromirrors, and different focal length. Since each micromirror array lens can freely change its optical axis and focal length with three-degree-of-freedom motions of its micromirrors, each micromirror array lens causes incident light to focus at any position along the planar surface of the optical disc.

By using the micromirror array lens, optical pick-up devices of the present invention can be very small, thin, and light. The micromirror array lens can focus and compensate for the optical tilt of the disc because the lens is provided with three-degrees-of-freedom motion. Thus, the present invention provides an optical pick-up device which can do focusing, tracking, and/or tilt compensation without macroscopic motions. Further, an optical pick-up device using a micromirror array lens has a simple structure and few moving parts.

BRIEF DESCRIPTION OF THE DRAWINGS

These and other features, aspects, and advantages of the present invention will be better understood by reference to the following detailed description when considered in conjunction with the accompanying drawings, wherein.

DETAILED DESCRIPTION

In a particularly preferred embodiment of the present invention there is provided an optical pick-up device for use in an optical recording/reproducing system. The optical pick-up device comprises at least one variable focal length micromirror array lens. The micromirror array lens records and/or reads information on or from an optical disc. The present invention provides focusing, tracking, and tilt compensation of the optical pick-up with minimal macroscopic motion.

Figure 1:
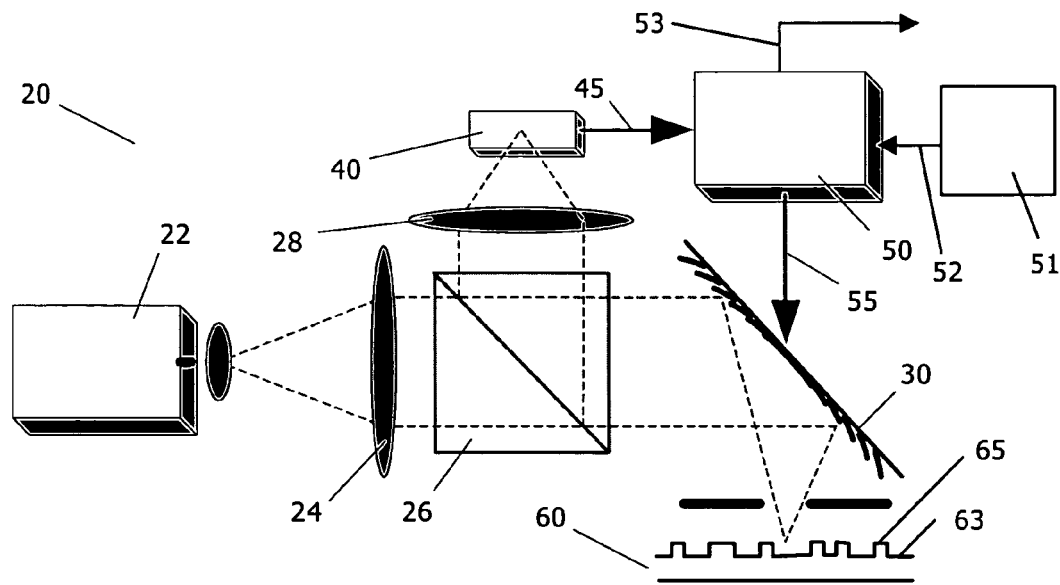
FIG. 1 is a schematic view of an optical pick-up device in accordance with the present invention.

While aspects of the present invention are applicable to a variety of optical pick-up devices, a representative example of an optical pick-up device 20 to which embodiments of the present invention are applied is shown in FIG. 1. As shown in FIG. 1, the optical pick-up device 20 includes a laser diode 22, a first optical lens 24, a beam splitter 26, a second optical lens 28, a micromirror array lens 30, a sensor 40, a tilt detector 51 and a signal processor 50. The foregoing components are preferable packaged as a single unit within the device. However, various components of the device, such as the signal processor, may be remote or detachable from the device.

The first and second optical lenses 24 and 28 are preferably conventional refractive lenses having fixed focal lengths. As illustrated in FIG. 1, the laser diode 22 emits a laser beam that passes through the first optical lens 24. The first optical lens created a collimated light beam which is passed to the beam splitter 26. The collimated beam passed to the beam splitter 26 is then focused onto a signal recording surface of an optical disc 60 by the micromirror array lens 30. The optical disc reflects a portion of the light beam back towards the micromirror array lens. The reflected light is collimated by the micromirror array lens and deflected substantially 90°, towards the beam splitter. The beam splitter deflects the reflected light substantially 90°, towards the second optical lens 28. The second optical lens focuses the reflected beam on the sensor 40.

As discussed above, the light passed through the first optical lens 24 is passed to the micromirror array lens 30. The micromirror array lens 30 is a variable focal length lens. Such a micromirror array lens was proposed by James G. Boyd IV and Gyoungil Cho in their paper entitled, "Fast-response Variable Focusing Micromirror Array Lens", *Proc. SPIE*, Vol. 5055, pp. 278-286 (2003), and improvements of the micromirror array lens are disclosed in U.S. patent application Ser. No. 10/806,299 (filed Mar. 23, 2004), Ser. No. 10/855,554 (filed May 27, 2004), Ser. No. 10/855,715 (filed May 27, 2004), Ser. No. 10/855,287 (filed May 27, 2004), Ser. No. 10/857,796 (filed May 28, 2004), Ser. No. 10/857,280 (filed May 28, 2004), and Ser. No. 10/857,714 (filed May 28, 2004), the entire disclosures of which are incorporated herein by reference.

Figure 2:
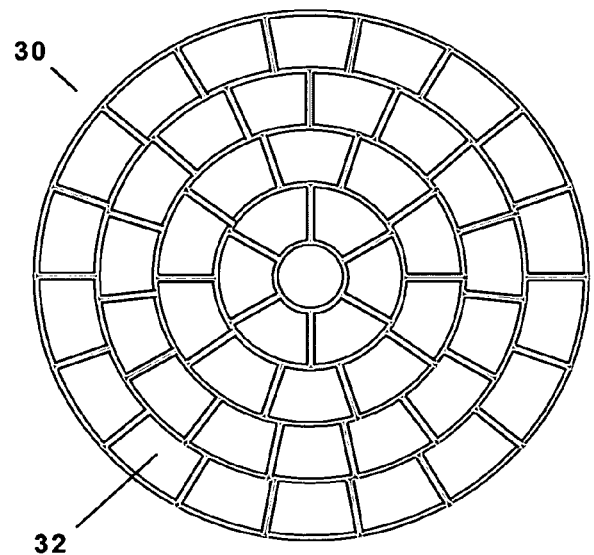
FIG. 2 is a top schematic view of a micromirror array lens in accordance with the present invention.

As shown in FIG. 2, the micromirror array lens 30 preferably comprises a plurality of micromirrors 32 concentrically arranged in a plane to form one or more concentric circles. However, the shape and the arrangement of each micromirror may be varied according to the shapes and the objectives of the micromirror array lens. The micromirrors 32 have the same function as a mirror and comprise a reflective surface made of metal, metal compound, or other materials with high reflectivity. Many known microfabrication processes may be used to make the surface have high reflectivity.

The micromirrors preferably comprise a parabolic cross-section and have a fan shape. This fan-shaped construction with curvature increase the effective reflective area and focusing efficiency of the micromirror array lens. In other embodiments, the reflective surface of the micromirrors may be flat.

The micromirrors 32 are individually controlled electrostatically and/or electromagnetically by actuating components that rotate and translate the micromirrors. The micromirrors are controlled to change the focal length of a micromirror array lens 30 by controlling their translational and/or rotational motions. The mechanical structures upholding the micromirrors 32 and the actuating components that rotate and translate the micromirrors are located under the micromirrors to enable the micromirrors to be positioned closer to one another. The close positioning of the micromirrors increases the effective reflective area of the micromirror array lens.

Figure 3:
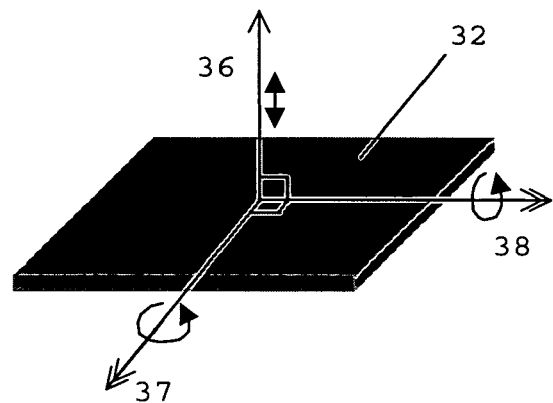
FIG. 3 is a perspective view showing the degrees-of-freedom of a micromirror in accordance with the present invention.

As shown in FIG. 3, each micromirror 32 has three degrees-of-freedom motion, one translational motion 36 along the normal axis to the plane of each micromirror array lens, and two rotational motions 37 and 38 about two axes in the plane of each micromirror array lens. The translational motion is required to meet phase matching condition to compensate for aberrations. The two rotational motions are required to deflect light arbitrary direction and are essential for versatility of the array of micromirror array lenses.

Figures 4A, 4B:
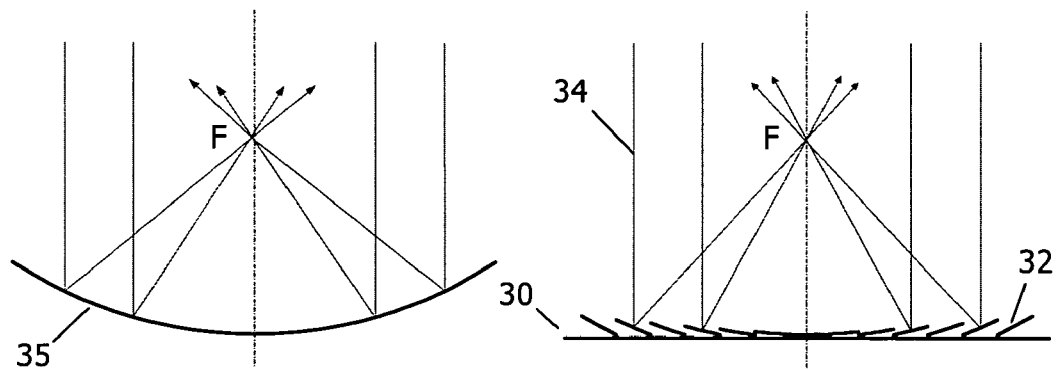
FIGS. 4(a) and 4(b) are schematic side views illustrating the analogy between a concave mirror and a micromirror array lens (Fresnel reflective lens)

FIGS. 4(a) and (b) illustrate the principle of a micromirror array lens and the analogy between a micromirror array lens 30 and a conventional concave mirror 35. It is well known that a concave mirror functions as a convex refractive lens. The micromirror array lens is effectively a type of reflective Fresnel lens. As shown in FIG. 4(b), a micromirror array lens comprises a plurality of micromirrors 32. Unlike the conventional concave mirror, the micromirror array lens can change its focal length by controlling the rotational and/or translational motion or micomirrors.

Therefore, by controlling each micromirror independently, the lens can correct defect and aberration which are caused by various optical effects such as optical tilt, mechanical deflection, and so on. The micromirrors can correct the phase error of light scattered from the disc to remove phase aberration by controlling the amounts of their translations. The lens also has a high optical focusing efficiency and can have a large size aperture without losing optical performance. The lens has low production cost because of the advantages of its mass productivity typical of microfabrication methods. The lens can also make the focusing system much simpler due to its simple structure.

Referring now back to FIG. 1, the sensor 40 comprises a photo detector. The photo detector converts photo energy of the light reflected by the optical storage media 60 into electric energy, in the form of an electrical data signal 45. The senor then sends the generated data signal to the signal processor 50 for processing. The sensor may be a coupled charge device (CCD), a CMOS image sensor, or any other suitable alternative.

In other embodiments, the sensor may comprise one or more photo detectors for detecting focus error and tracking error signals.

The signal processor 50 is preferably a processing unit comprised within or detachable from the optical pick-up device 20. The signal processor uses an algorithm to analyze the data signal from the sensor 40. One of various well-known conventional signal processing algorithms can be used depending on the application. The tilt detector 51 measures the tilt of the optical disc. The measured tilt is sent to the signal processor 50. The signal processor processes the data signal received from the senor and the tilt detector and generates a reproduction or RF signal 53 corresponding the recorded information on the optical disc, and controls signals 55 which are sent to micromirror array lens to compensate for correct tracking error, focusing error, and tilt error.

Figure 5A:
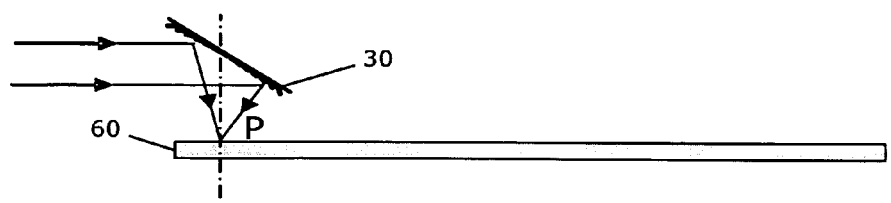
FIGS. 5(a) and 5(b) are schematic side views illustrating how micromirror array lenses of the present invention compensate for tilt of the optical disc.
Figure 5B:
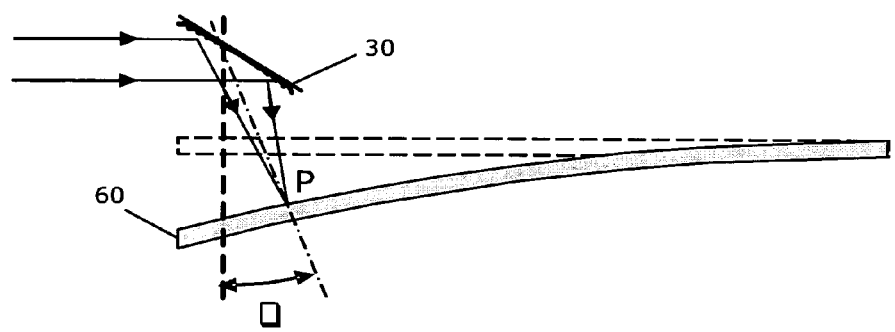

FIGS. 5(a) and 5(b) illustrate how the micromirror array lens 30 compensates for tilt and deflection of the optical disc 60 when in use. When a tilt and/or mechanical deflection of a disc 60 occur, the micromirror array lens 30 maintains the focus at the point P on the disc by changing its focal length and optical axis. In addition, the micromirror array lens 30 can also correct various aberrations because the lens is an adaptive optical lens. Thus, with no macroscopic motions, the lens can compensate for a focusing error, a tracking error, and aberration by tilt and/or mechanical deflection.

FIG. 1 illustrates how the optical pick-up devices of the present invention reads data from an optical disc 60. The laser diode 22 emits a laser beam which is passed through the first optical lens 24. The first optical lens collimates the light beam. The light beam is then passed to the beam splitter 26. The light is passed from the beam splitter to the micromirror array lens 30. The micromirror array lens deflects the light beam substantially 90°, and focuses the light on a tracking location on a data layer of the optical disc 60. Light reflected from a reflective layer or the optical disc is collimated by the micromirror army lens 30, and deflected back towards the beam splitter 26. The beam splitter then deflects the reflected light substantially 90°, towards the second optical lens 28. The second optical lens passes the reflected light and focuses it on the sensor 40. The sensor detects the intensity of the reflected light from the reflective layer of the optical disc, and generates an electrical signal 45 based on the intensity of light it receives. In that regard, the reflected light is more diffused, or has a weak intensity when it hits a pit 63 in the data layer. The reflected light has a strong intensity when it strikes the smooth areas, or lands 65, in between the pits. The data signal is generated by pits and lands.

The electrical signal is passed to the signal processor 50. The signal processor generates a reproduction signal 53. The signal processor also generates control data 55 which is sent to the micromirror array lens to adjust the micromirrors to compensate for tracking error, focusing error, and tilt error.

Similarly, optical pick-up devices of the present invention are capable of writing data onto the optical disc 60. In that regard, the intensity of the laser beam emitted by the laser diode 22 is varied according to a data signal transmitted to the laser diode via a data storage device (not shown) within the optical recording/reproducing system. The laser beam is passed through the first optical lens 24. The first optical lens collimates the light beam. The light beam is then passed to the beam splitter 26. The light is passed from the beam splitter to the micromirror array lens 30. The micromirror array lens deflects the light beam substantially 90°, and focuses the light on the dye layer of the optical disc 60. Depending on the intensity of the laser beam, the dye used to form the optical disc reacts to the heat and light to create a series of recorded pits and lands corresponding the stored data.

When an optical disc is titled in an optical disc drive, the signal quality of a recording signal and/or reproduced signal of the optical disc may be lowered. In order to correct the tilt of the optical disc, the optical pick-up device may comprise a tilt detector 51, as shown in FIG. 1. The tile detector detects the tilt of the optical disc and generates a tilt signal 52 in response to the detected tilt. The tilt signal is transmitted to the signal processor 50. The signal processor processes the tilt signal and transmits a control signal 55 to the micromirror array lens to compensate for tilt error.

In the typical optical pick-up device, a magnetically driven conventional lens has both focusing and tracking motions to record information on a disc or to read the recorded information from the disc. In a more advanced device, a conventional lens is moved macroscopically in one or more directions to compensate for the optical tilt, which results in comma aberration. However, in optical pick-up devices of the present invention, the micromirror array lens 30 can cover the focusing, tracking, and tilt compensation operations of a conventional lens without macroscopic motions. This possible because the micromirror array lens is a variable focal length lens, capable of changing optical axis and compensating for aberrations by the microscopic three-degree-of-freedom motions of each micromirror. By replacing the magnetically driven conventional lens with a micromirror array lens, a much simpler configuration can be achieved by reducing the number of moving parts.

Figure 6:
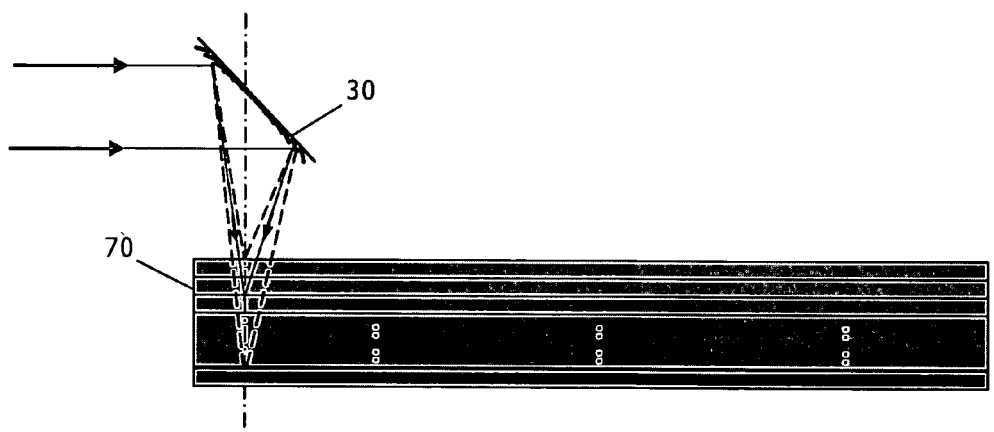
FIG. 6 is a schematic side view illustrating how micromirror array lenses of the present invention record data on or read data from a multi-layered optical disk.

As shown in FIG. 6, micromirror array lenses 30 of the present invention are capable of recording data on and reading data from a multi-layered optical disc 70. In this instance, the micromirror array lens records and/or reads information at each layer of a multi-layered optical disk by changing its focal length to focus on the desired layer.

Figure 7:
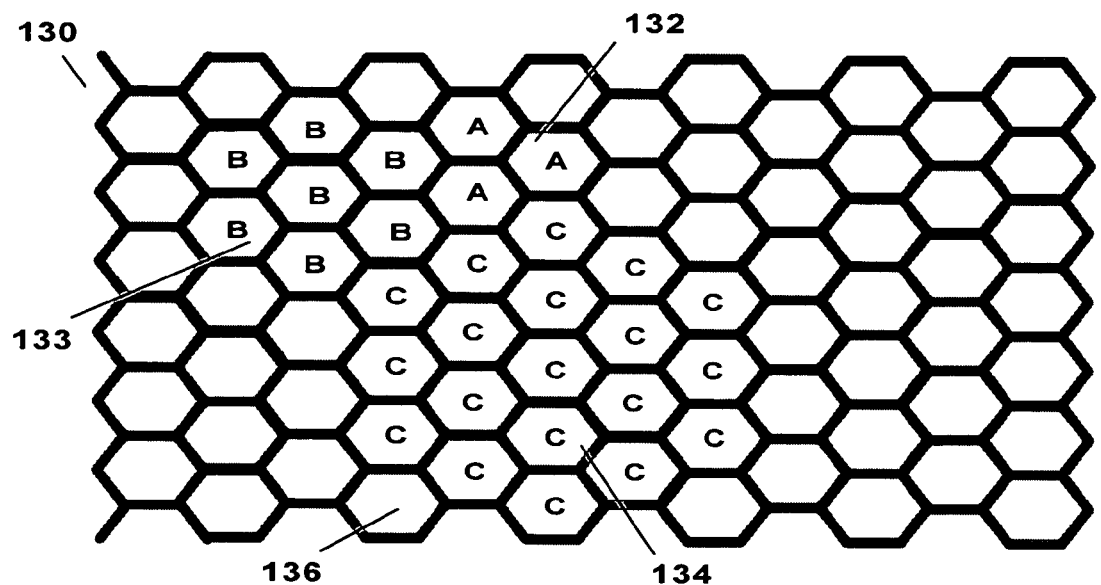
FIG. 7 a schematic top view of an array of micromirror array lenses in accordance with the present invention.
Figure 8:
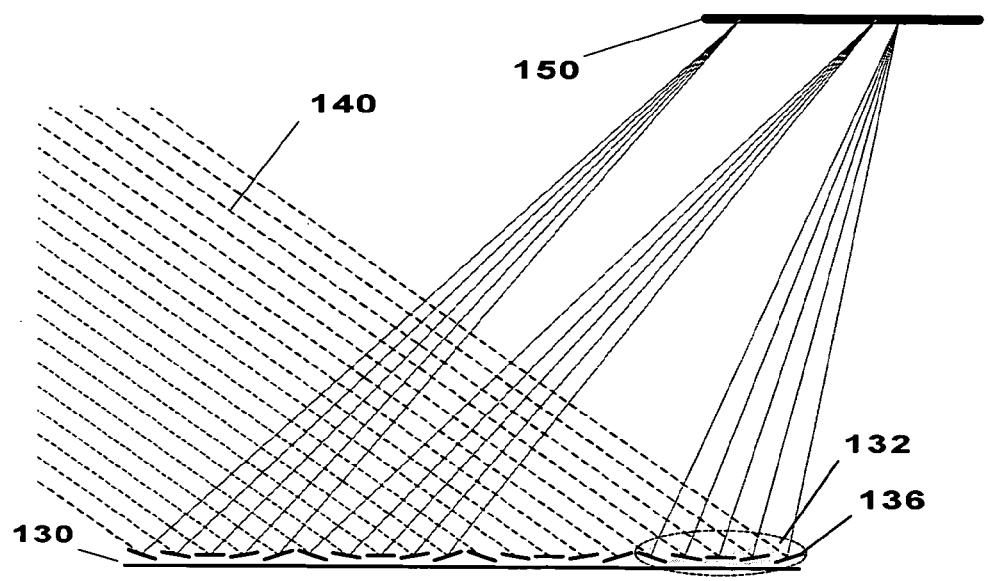
FIG. 8 is a schematic side view of portion of an optical pick-up device comprising an array of micromirror array lenses.

In other embodiments of the present invention, as shown in FIGS. 7 and 8, the optical pick-up device may comprise a planar array 130 of micromirror array lenses 132, 133, 134 with different shapes, sizes, and numbers of micromirrors 136. Such an array of micromirror array lenses is disclosed in U.S. patent application Ser. No. 10/857,714 (filed May 28, 2004), the disclosure of which is hereby incorporated by reference as if set forth in full herein.

Accordingly, the position of each micromirror array lens is not fixed in the plane and many different micromirror array lenses 132, 133, 134 can be "created" and "deleted". In addition to all the optical parameters such as the focal length, optical axis, lens size, the number of micromirrors, and others of each micromirror array lens, the total number of lenses comprising the array is variable according to the purpose of the array.

The micromirror array lenses are not limited to the configuration shown in FIG. 7. The micromirrors can have arbitrary shapes and sizes, and form a lens with arbitrary shape and size or an array of micromirror array lenses. Even though only the hexagonal shape is shown in FIG. 7, the micromirrors can have different shapes to form different types of lens arrays without losing their effective reflective area. In order to increase the effective reflective area, the control circuitry of the lens can be constructed by known microelectronics technology which is located under the mirrors.

As shown in FIG. 8, each micromirror array lens 132 can have a different optical axis, different number of micromirrors 136, and different focal length. Since each micromirror array lens 132 also can freely change its optical axis and focal length with three-degree-of-freedom motions of its micromirrors, each micromirror array lens causes incident light 140 to focus at any position in a plane 150 or scan the whole plane.

Figure 9:
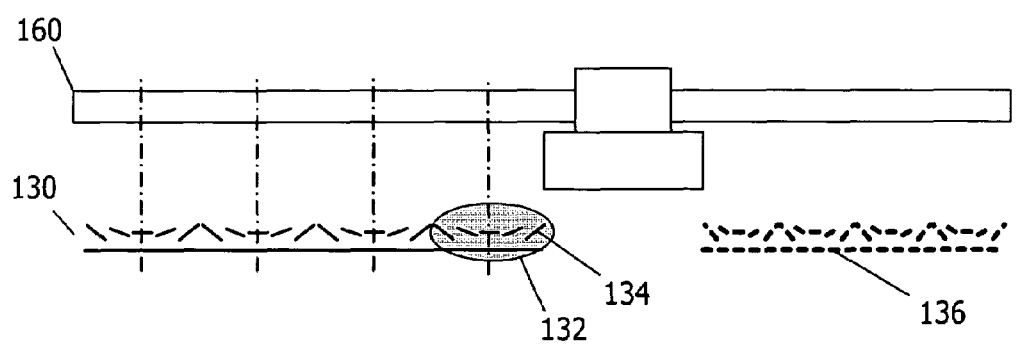
FIG. 9 is a schematic side view of a high-speed optical pick-up device having an array of micromirror array lenses.

FIG. 9 shows a high-speed optical pick-up device of the present invention with a planar array 130 of micromirror array lenses 132. As mentioned above, the micromirror array lens can cover the focusing, tracking, and/or tilt compensation operational motions of a conventional optical pick-up device. In this embodiment, macroscopic motion is only needed for the tracking operation of the device using the micromirror array lens. However, if the array 130 is set to cover the whole radial region of a disc 60, even the tracking operation will be covered and then there will be no macroscopic motions in the optical pick-up device. Since each lens of the lens array can change its focal length and optical axis very fast by controlling each of their micromirrors 134, each lens is only required to scan its assigned region of the disc without any macroscopic motion and is much faster than a micromirror array lens with tracking operations. In addition, the system can be sped up as more lenses 132 are added to the array in the radial direction.

Thus, if an array of micromirror array lenses is applied to the system, all macroscopic motions including tracking motion are no longer needed. The optical recording/reproducing system can improve its reliability and reading/writing speed with high optical focusing efficiency by removing moving parts in the optical pick-up device.

At present, there exist many kinds of optical information recording media, and the standards of these optical information recording media are established. Because the optical information recording media have different recording densities, interchangeability between CD and DVD is required. These optical information recording media have different thicknesses of the transparent base board. In order to obtain the interchangeability, it is necessary to correct a spherical aberration generated by the difference of the thickness of the transparent base boards. The spherical aberration can be compensated by controlling the rotations and/or translations of micromirrors.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of the invention.

Accordingly, the foregoing description should not be read as pertaining only to the precise structures described and illustrated in the accompanying drawings, but rather should be read consistent with and as support to the following claims, which are to have their fullest and fair scope.

What is claimed is:

1. An optical pick-up device for reading information from and recording information on an optical disc comprising:
   at least one micromirror array lens,
   wherein the micromirror array lens is a reflective Fresnel lens including a plurality of micromirrors each with two rotational degrees-of-freedom motion and one translational degree-of-freedom motion,
   wherein the two rotational degrees-of-freedom motion are controlled to deflect light to a focal point and the one translational degree-of-freedom motion is controlled to meet phase matching conditions and to correct a phase error of the light, and
   wherein the three degrees-of-freedom motion of the micromirrors in the micromirror array lens are adjustable to vary a focal length of the micromirror array lens while satisfying a converging condition by the rotational degrees-of-freedom motion and the phase matching conditions by the translational degree-of-freedom motion of the micromirrors in the micromirror array lens.

2. The optical pick-up device of claim 1, wherein the micromirror array lens is used for focusing a laser beam on the optical disc.

3. The optical pick-up device of claim 1, wherein the micromirror array lens is used for tracking tracks of the optical disc.

4. The optical pick-up device of claim 1, wherein the micromirror array lens is used to compensate for the tilt of the optical disk.

5. The optical pick-up device of claim 1, wherein the optical axis of the micromirror array lens is changed.

6. The optical pick-up device of claim 1, wherein the micromirror array lens records information on each layer of a multi-layered optical disc by changing its focal length.

7. The optical pick-up device of claim 1, wherein the micromirror array lens reads information from each layer of a multi-layered optical disc by changing its focal length.

8. The optical pick-up device of claim 1, wherein the one translational degree-of-freedom motion allows each micromirror in the array of micromirror array lenses to meet the phase matching conditions to compensate aberration and the two rotational degrees-of-freedom motion allow each micromirror in the micromirror array lens to rotate about two perpendicular axes to deflect light to the focal point.

9. The optical pick-up device of claim 1, wherein the micromirror array lens is an adaptive optical lens and corrects aberration while satisfying the converging and the phase matching conditions.

10. The optical pick-up device of claim 1, further comprising:
   a laser diode, wherein the laser diode generates a light beam that is passed through a conventional lens that collimates the light;
   a beam splitter, wherein the beam splitter passes the collimated light to the micromirror array lens, and wherein the micromirror array lens deflects the light and focuses the light on a tracking location along the optical disc while performing aberration correction;
   a photodetector for detecting light reflected from the surface of the optical disc, wherein the photodetector generates an electrical signal based on the intensity of the reflected light, the electrical signal corresponding to the information recorded on the optical storage media; and
   a signal processor that processes the electrical signal and generates a control signal, wherein the control signal is transmitted to the micromirror array lens to adjust the relative positions of the micromirrors within the micromirror array lens.

11. The optical pick-up device of claim 10 further comprising a tilt detector that measures tilt of the optical disc, wherein the measured tilt data is transmitted the signal processor, and the signal processor generates a control signal that is transmitted to the micromirror array lens to adjust the micromirrors according to the measured tilt.

12. An optical pick-up device for reading information from and recording information on an optical disc comprising:
   an array of micromirror array lenses,
   wherein the micromirror array lenses are reflective Fresnel lenses each including a plurality of micromirrors each with two rotational degrees-of-freedom motion and one translational degree-of-freedom motion,
   wherein the two rotational degrees-of-freedom motion are controlled to deflect light to a focal point and the one translational degree-of-freedom motion is controlled to meet phase matching conditions and to correct a phase error of the light, and
   wherein the three degrees-of-freedom motion of the micromirrors in the micromirror array lenses are adjustable to vary focal lengths of the micromirror array lenses while satisfying converging conditions by the rotational degrees-of-freedom motion and the phase matching conditions by the translational degree-of-freedom motion of the micromirrors in the micromirror array lenses.

13. The optical pick-up device of claim 12, wherein the focal length of each micromirror array lens in the array of micromirror array lenses is changed independently.

14. The optical pick-up device of claim 12, wherein the optical axis of each micromirror array lens in the array of micromirror array lenses is changed independently.

15. The optical pickup device of claim 14, wherein the scanning operation of each micromirror array lens plays the role of tracking, thereby eliminating macroscopic tracking motion.

16. The optical pick-up device of claim 12, wherein the one translational degree-of-freedom motion allows each micromirror in the array of micromirror array lenses to meet phase matching condition to compensate aberration and the two rotational degrees-of-freedom motion allow each micromirror in the array of micromirror array lenses to rotate about two perpendicular axes to deflect light to the focal point.

17. A method for reading information from an optical disc, comprising:
   generating a laser beam, the beam being directed towards at least one micromirror array lens, wherein the micromirror array lens includes a plurality of micromirrors and deflects the laser beam and focuses the laser beam on a point along the optical disc while satisfying a converging condition by rotational motion of the plurality of micromirrors and phase matching conditions by translational motion of the plurality of micromirrors in the micromirror array lens;
   correcting aberration of the laser beam and focusing the laser beam by the micromirror array lens on a tracking location on a data layer of the optical disc while satisfying the converging and phase matching conditions;
   detecting light reflected from a reflective surface of the optical disc;
   generating an electrical signal carrying data based on the intensity of light reflected from the reflective surface; and
   processing the electrical signal, wherein the processed signal corresponds to information recorded in the optical disc.

18. A method for recording information onto an optical disc, comprising:
   transmitting a data signal to a light source, wherein the data signal corresponds to information stored in an optical recording/reproducing system;
   emitting a beam of light from the light source towards at least one micromirror array lens, wherein the intensity of the emitted light is varied according to the data signal and wherein the micromirror array lens includes a plurality of micromirrors;
   focusing the beam of light with aberration correction onto the optical disc using the micromirror array lens while satisfying a converging condition by rotational motion of the plurality of micromirrors and while satisfying phase matching conditions by translational motion of the plurality of micromirrors in the micromirror array lens; and
   storing data by reaction of a dye layer of the optical disc with the focused beam of light to create a series of recorded pits and lands corresponding to the stored information.

* * * * *